April 8, 1969 F. KAESS ET AL 3,436,898
HOT GAS FILTER
Filed March 15, 1966

INVENTOR
FRANZ KAESS
OTTO KICK

United States Patent Office 3,436,898
Patented Apr. 8, 1969

3,436,898
HOT GAS FILTER
Franz Kaess, Traunstein, and Otto Kick, Hart (Alz), Germany, assignors to Suddeutsche Kalkstickstoff-Werke Aktiengesellschaft, Trostberg, Germany
Filed Mar. 15, 1966, Ser. No. 534,300
Claims priority, application Germany, Mar. 15, 1965, S 95,971
Int. Cl. B01d 29/24
U.S. Cl. 55—269    1 Claim

ABSTRACT OF THE DISCLOSURE

A ceramic filter for high temperature gas purification, individual filter elements constituted by porous ceramic tubes upwardly prolonged by non-porous perforated spacer tubes are arranged in a vertical casing divided by two horizontal partitions into three chambers. The lower chamber is the gas inlet chamber where the gases surround and enter the filter elements. In the middle chamber, the purified gases leave the filter elements through the perforations of the spacer tubes and are withdrawn. The upper chamber is not entered by hot gases, contains springs protected from the heat of the gases for compressing the filter elements, and is accessible from the outside. Holes in the partitions accommodating the filter elements at the support means for the elements are so dimensioned as to allow individual withdrawal of the filter elements upwardly through the opened upper chamber. Deformation of the middle chamber is prevented by spacer bolts connecting the two partitions and subjected to the same thermal expansion for the same length as the spacer tubes.

---

Figure 1:
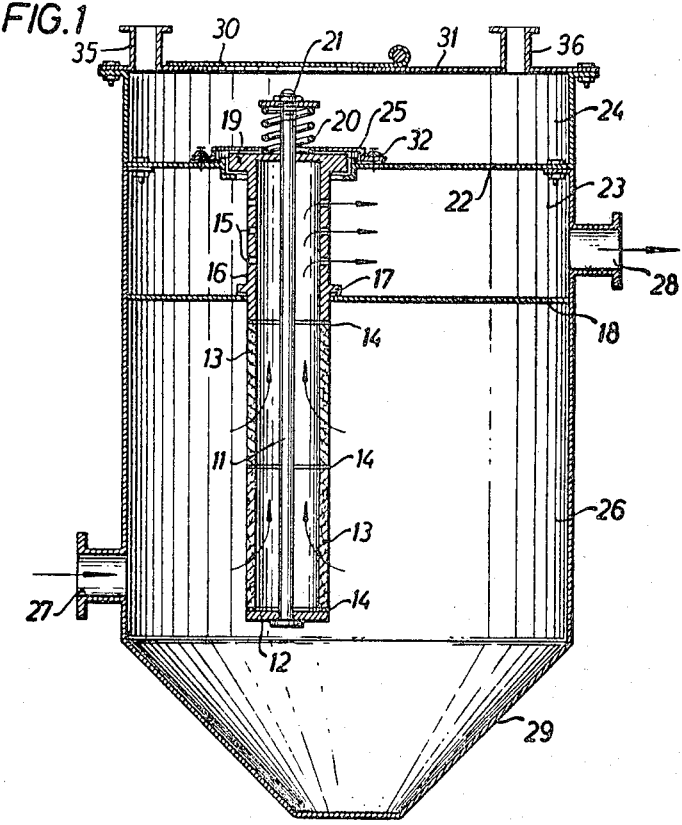

This invention relates to improvements in filters for the dry purification of hot gases.

For the purification of such gases, which may be obtained in melting furnaces and may have a temperature in excess of 300° C., so-called filter candles are used. As far as the filter candles have not a single shell, they consist of a number of filter tubes aligned on a central tie rod. The candles are set on a filter bottom which maintains separation of raw gas and pure gas; the gas can pass into the interior of the filter only through the filtering surface and passes then from there into the pure gas space. The unhindered outlet of the pure gas at the upper end of the filter can be ensured, for instance, by a spacing tube provided with perforations; such spacing tube is slid upon the tie rod above the filter bottom, and the entire filter is pressed by means of screws onto a support at the bottom end of the tie rod.

In such tubes, great temperature oscillations take place particularly because unheated sweeping gas is passed in reverse direction through the filter tubes for their reactivation. In order to compensate for such variations, the individual filter tubes are not pressed against each other rigidly with their front ends but such compression is carried out by means of springs. However, we have found that none of the known spring steels is able to withstand the chemical attack and thermal stresses for extended periods of time.

It is, therefore, a primary object of this invention to provide a tubular filter apparatus consisting of a plurality of coaxial filter tubes held in axial compression by spring means where not only the life of the spring means is prolonged but also exchange thereof is ensured without entering the raw gas space.

Further objects and advantages will become apparent from a consideration of the specification and claims.

Briefly, the invention solves the problem by removing the spring means which presses the front ends of the tubes against each other, out of the flow path of the incoming and outflowing gases and of the thermal stresses associated therewith.

Preferably, the springs are arranged above a spacing tube which extends upwardly of the tubular filters and above an intermediate bottom closing the space for the purified gases; they form compression springs forcing the tubular filters, by means of the spacing tube, against a support at the lower end of the structure. In order to ensure ready replacement of entire sets of filter candles, the seal between the spacing tube and the intermediate bottom has a larger internal diameter than the outer diameter of the seal of the spacing tube with respect to the filter closure separating the spacing tube from the filter tubes. The continuously active pressure spring makes it possible to use a larger filter surface per filter candle, even for different expansions of different filter materials such as ceramics or sinter metals. In addition, specifically larger filter areas are more easily cleaned and allow cleaning by means of blow-back gas under lower pressure.

The clamping of the individual filter tubes according to the invention prolongs the life of the filter candle by more than three times. For a filtering load of about 30 cbm. of hot raw gas per m.² of the filter candle surface per hour, the useful life was hardly two months; when filter candles according to the invention were used, the service life was increased to 24 months.

Figure 2:
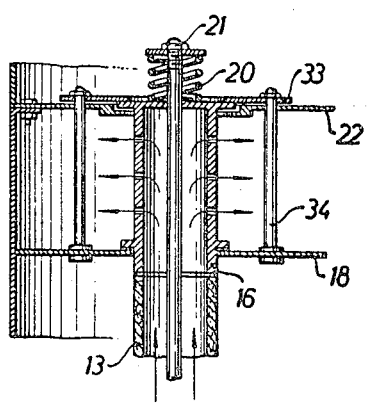

Further details and advantages will be described in connection with the accompanying drawings wherein:

FIG. 1 is a vertical section of a filter case with a tubular filter according to the invention, and FIG. 2 is a fragmentary elevation-in-section of another embodiment of the tubular filter mounting system.

Referring to FIG. 1, the tubular filter is arranged in a filter case 29 provided at its lower end with a nipple 27 for the incoming raw gas and at the top with a nipple 28 for connection to the discharge line for the pure gas. The case 29 has a filter closure 18 and above said closure 18 an intermediate closure 22. The closure 18 keeps the raw gas and pure gases separated, the closure 22 separates the pure gas from the spring chamber 24.

The tubular filters are accommodated in bores of the upper intermediate closure 22 and the bottom closure 18, whereby the flange 17 supports the tube and the upper flange 19 ensures additionally the radial guidance. Said flanges 17 and 19 are arranged at a spacer tube 16 provided with radial apertures 15 for the discharge of the gases. Said spacer tube 16 extends substantially only in the space 23 formed between the two closures 22 and 18. The flange 19 is forced through spring washers 32 and clamping discs 25 against the closure 22. Suitable gaskets must, of course, be used. An annular opening in the closure 22 sealed by the flange 19 has a larger inner diameter than the lower flange 17 of the spacer tube, which flange serves to provide a seal against the filter closure 18. In this way, the entire tubular filter is easily removed from the case 29 and replaced. In order to be able to remove readily the tubular filter in a simple operation, the upper flange 19 has a larger outer diameter than the annular opening of the closure 22 used for the seal.

The filter tubes 13 are joined axially to the lower end of the spacing tube 16, whereby the juncture is sealed by gaskets 14. The upper lid of the spacing tube 16 supports a compression spring 20, which is concentric to the central tension rod 11 extending over the entire length of the spacing tube 16 and the filter tubes 13. At its lower end, said tension rod carries a plate 12 supporting the lowermost filter tube 13. At its upper end, the tension rod 11 is equipped with a locknut and washer 21 compressing the spring 20; by the tension of said spring, the individual filter tubes 13 and the spacer tube 16 are placed in compression and sealed. Thereby, the spring 20 is located outside the flow path or space 26 of the entering crude gases as well as outside the flow path or space 23 of the purified gases so as to be protected from the high temperatures and temperature variations obtaining in the chambers 23 and 26. In addition, the spring is arranged in a chamber 24 which is closed by an upper detachable closure 31 of the case 29 or by a flap 30 of said closure. Said chamber 24 can be kept at any suitable low temperature by means of cold purified gas or cover gas entering through inlet 35 and leaving through outlet 36. The lid 31 and the flap 30 ensure ready removal of the tubular filter.

In the embodiment of the invention shown in FIG. 1, the thermal expansion of the spacer tube 16 is taken up by the spring washers 32. The intermediate closure 22 and the filter closure 18 are also under tension by the forces required for a safe seal of the filter closure 18.

In FIG. 2, the spacer tube 16 is forced against the filter closure 18 by means of spacer bolts 34. Said bolts are secured to the filter closure 18, pass through the intermediate closure 22 and clamp by means of nuts and pressure rings 33 the upper flange of the spacer tube so as to force the same against the filter closure 18. As said spacer bolts are contacted by the hot gases for the same length as the spacer tube, they are subject to the same thermal exapsnion, and the filter and intermediate closures will not bulge.

Though, for the sake of simplicity, we have shown and described only the mounting of a single tubular filter unit in the filter case, it will be obvious that the interior of the filter case can accommodate any desired number of such filter units in the same manner.

We claim:
1. A filter for high temperature gas purification comprising a vertical filter case, an upper and a lower plate extending in spaced relationship over the whole width of said case and dividing the inside of the case into an upper chamber, a middle chamber, and a lower chamber, said upper chamber being sealed from the middle chamber and being equipped for the passage of cooling gas to act as cooling chamber, at least one elongated filter element supported on said upper plate and extending through said middle chamber and an aperture of said lower plate into said lower chamber, said filter element consisting of a lower porous ceramic filter tube in said lower chamber and an upper non-porous perforated spacer tube in said middle chamber and forming the only communication between said middle and lower chamber, tie rod means and support means at the lower end of said tie rod means supporting said filter element, said tie rod means extending inside said filter element from said lower chamber into said upper chamber, spring means acting on said tie rod means in said upper chamber and placing said filter tube and spacer tube under compression, a lower flange at the lower end of said spacer tube seated in said aperture of said lower plate and a upper flange at the upper end of said spacer tube seated in an opening of said upper plate, the diameter of said opening in said upper plate being larger than the diameter of said lower flange, cover means at the top of said upper chamber to allow access to the upper plate and withdrawal of individual filter elements through said opening in said upper plate, spacer bolts connecting said upper and said lower plate and being contacted by the hot gases for the same length as said spacer tube so as to be subjected to the same thermal expansion, a gas inlet into said lower chamber, and a gas outlet from said middle chamber, the hot gas passing from said lower chamber into and through the porous filter tube, leaving the filter element through the perforations of said spacer tube into the middle chamber and being withdrawn from the filter without entering the upper chamber.

References Cited

UNITED STATES PATENTS

| 582,400 | 5/1897 | Stifel | 210—323 X |
|---|---|---|---|
| 945,632 | 1/1910 | Strahl | 55—498 X |
| 1,203,835 | 11/1916 | Zahm | 210—323 X |
| 1,316,883 | 9/1919 | Fatscher | 55—341 X |
| 2,390,494 | 12/1945 | Briggs et al. | 210—323 |
| 2,391,534 | 12/1945 | Yerrick et al. | 55—341 X |
| 2,477,623 | 8/1949 | Kling | 55—341 |
| 2,526,651 | 10/1950 | Garbo | 55—303 X |
| 2,548,400 | 4/1951 | Shepard | 210—323 |
| 2,562,730 | 7/1951 | Miller | 210—193 X |
| 2,792,074 | 5/1957 | Schilb et al. | 55—341 X |
| 2,872,044 | 2/1959 | Kasten | 210—323 |
| 2,892,510 | 6/1959 | Wygant | 55—302 X |

FOREIGN PATENTS

| 868,286 | 9/1941 | France. |
|---|---|---|
| 981,533 | 1/1951 | France. |
| 550,309 | 5/1932 | Germany. |
| 724,927 | 2/1955 | Great Britain. |
| 855,068 | 11/1960 | Great Britain. |

HARRY B. THORNTON, *Primary Examiner.*

DENNIS E. TALBERT, JR., *Assistant Examiner.*

U.S. Cl. X.R.

55—341, 350, 481, 484, 508, 509, 523; 210—323